United States Patent [19]

Bowers et al.

[11] Patent Number: 5,529,650
[45] Date of Patent: Jun. 25, 1996

[54] METHOD OF MAKING FLOCKED, VEHICLE MOLDING

[75] Inventors: Daniel W. Bowers, Union; Keiji Asahina, Dayton, both of Ohio

[73] Assignee: Green Tokai Co., Inc., Brookville, Ohio

[21] Appl. No.: 248,414

[22] Filed: May 24, 1994

[51] Int. Cl.⁶ .............................. B05D 1/14; B29C 65/40
[52] U.S. Cl. ...................... 156/64; 49/490.1; 156/72; 156/244.11; 156/244.12; 156/279; 156/324.4; 156/331.7; 264/40.6; 264/40.7; 264/131; 264/167; 264/173.12; 264/173.17; 427/200; 427/206
[58] Field of Search ...................... 156/64, 72, 244.11, 156/244.12, 244.24, 279, 309.6, 320, 324, 331.7, 324.4; 264/40.6, 40.7, 131, 167, 171, 177.17, 173.12, 173.17; 427/200, 206; 428/90; 49/441, 490.1

[56] References Cited

U.S. PATENT DOCUMENTS

| | | | |
|---|---|---|---|
| 3,067,455 | 12/1962 | Reid | 18/4 |
| 3,275,487 | 9/1966 | Lemelson | 156/72 |
| 3,765,922 | 10/1973 | Chisholm | 156/72 |
| 4,130,535 | 12/1978 | Coran et al. | 260/33.6 |
| 4,311,628 | 1/1982 | Abdou-Sabet et al. | 260/33.6 |
| 4,319,942 | 3/1982 | Brenner | 156/72 |
| 4,409,365 | 10/1983 | Coran et al. | 525/78 |
| 4,800,681 | 1/1989 | Skillen et al. | 428/90 |
| 4,865,796 | 9/1989 | Tamura et al. | 264/40.7 |
| 4,891,269 | 1/1990 | Markevka et al. | 428/423 |
| 4,957,968 | 9/1990 | Adur et al. | 525/74 |
| 4,982,486 | 1/1991 | Otagawa et al. | 29/527.4 |
| 5,123,988 | 6/1992 | Iwasa | 156/244.11 |
| 5,137,984 | 8/1992 | Kangas et al. | 525/411 |
| 5,151,307 | 9/1992 | Jackson | 156/244.11 |
| 5,190,607 | 3/1993 | Werner et al. | 156/331.7 |
| 5,207,027 | 5/1993 | Larsen | 49/490.1 |
| 5,288,359 | 2/1994 | Stobbie | 156/331.7 |
| 5,332,541 | 7/1994 | Tamura | 264/177.17 |

FOREIGN PATENT DOCUMENTS

| | | | |
|---|---|---|---|
| 3726555 | 2/1989 | Germany | 428/90 |
| 241965 | 11/1985 | Japan . | |

*Primary Examiner*—Steven D. Maki
*Attorney, Agent, or Firm*—Biebel & French

[57] ABSTRACT

Processes for the formation of flocked automotive molding members of the type adapted to border windshield and door windows are disclosed. The processes include coextrusion of a thermoplastic polymer and reactive hot melt adhesive in a common die orifice or head onto a profiled metal strip. The hot melt provides an adhesive layer for subsequent flock adherence to the thermoplastic polymer. The hot melt is moisture curable, thereby eliminating need for a curing oven or the like downstream from the flocking station.

6 Claims, 5 Drawing Sheets

METHOD OF MAKING FLOCKED, VEHICLE MOLDING

FIELD OF THE INVENTION

The present invention pertains to methods for producing flocked, extruded vehicle molding members such as the type used to support automobile window panes and to border automobile door members and the like.

BACKGROUND OF THE INVENTION

Automotive molding structures of the type adapted to support and guide a car window have been known for years. Traditionally, such moldings are extrusions comprising a metal core strip that is rolled or bent into the desired channel or arch shape. The channel or arch shaped extrusion is snugly fit over or around a door, side or roof panel and provides, in some cases, a decorative interface between the car panel and window. An elastomeric, flocked lip or the like is adhered to the strip and bears upon the window to provide a seal and serve as a guide for window reciprocation in those cases in which the extrusion provides interface between the automobile body and a moving window.

One window pane support and/or guide member is disclosed in U.S. Pat. No. 3,067,455 (Reid). In this patent, a core strip is passed through a first extruder where it is provided with an uncured rubber or rubber material. Downstream from the first extruder, a second extruder provides one or more relatively narrow, longitudinally disposed layers or ribs of uncured sponge rubber on the strip. The rubber is then cured by passing through a heater and is then conveyed to a downstream flocking operation. The flocked core strip passes through forming rolls for formation of the finished channel-shaped form. The advancing strip is then cut into the desired lengthwise dimensions.

In U.S. Pat. No 4,865,796 (Tamura et al.) automobile moldings formed at least partially from a synthetic resin are disclosed. The cross-sectional shape of the extrusion is varied along the extrusion length by removing controlled amounts of the synthetic resin from the advancing extrusion. The extrusions are utilized as window moldings, and so-called drip moldings which are commonly positioned along the lengthwise roof sides of the automobile.

In the manufacture of automobile moldings, especially the so-called "belt line" moldings that border the interface between a car door panel and the bottom outside edge of the door windows, it has become aesthetically fashionable to provide a strip of stiff decorative or ornamental plastic material on the outer or inner side of the arch or channel shaped molding in combination with the lustrous or "chrome" look of an exposed portion of the core material. In addition to these aesthetic functions, the inner portion of the molding comprises a flocked elastomeric lip adapted to bear against the window, sealing the door from the elements, and providing a guide for reciprocating movement of the window.

In order to produce flocked moldings, it is necessary to supply an even coating of adhesive along the desired molding surface so that the short flocking fibers will uniformly adhere thereto. These adhesives are generally applied to the molding after the requisite decorative and elastomer polymers had been extruded onto the travelling core or strip during the process. Commonly, these adhesives are applied to the travelling core by being fed to the nip formed between the core and a specially contoured feed roller; the latter having been specifically configured to correspond to the profiled shape of the core.

Irregularities in the feed of adhesive to this interface or in the shape of the feed roller lead to uneven application of desired adhesive thickness and resulting poor flocking uniformity. The irregularities are a leading source of inferior, reject product that must be culled from acceptable production run quantities. Accordingly, there is a need to provide a method for making flocked, automobile molding members in which flocking adhesive coating uniformity is improved, thereby resulting in reduction of unacceptable product quantities made.

The adhesive compositions themselves are generally of the thermosetting type which require application of heat thereto after the flocking operation in order to cure the adhesive and provide firm support for the fibers. Any process in which this heating step could be eliminated is of great desire as it will lead to considerable savings in energy and process completion time.

Additionally, most of the adhesives utilized for flock adherence to substrate are provided in a volatile organic solvent system such as toluene, MEK, MIK, and others. Accordingly, a process in which emission of VOCs from flock adhesives is minimized is of considerable benefit.

SUMMARY OF THE INVENTION

These and other objects of the invention are met by the instant process for preparing a flocked, vehicle molding such as an automobile belt line or window molding. Briefly, the process comprises coextrusion of the flocking adhesive and the required polymeric material(s) in a common die orifice or head rather than the prior method of separately applying the adhesive, downstream from the plastics extruder, at the nip between the traveling core and specifically configured adhesives applicator or feed roll.

Additionally, in accordance with the invention, a moisture curable reactive hot melt adhesive is used to adhere the flock to the desired surface. This adhesive comprises little or no volatile organic solvents and is accordingly more suitable to a less hazardous working environment than are the typical VOC emitting adhesives. The adhesives used in the invention moisture cure to provide firm adhesion between flock and substrate. Accordingly, the overall process for forming the molding is devoid of an oven or heating step downstream from the flocking operation. This, of course, results in considerable energy savings and abbreviated process completion time.

The invention will be further explained in the following detailed description taken in conjunction with the drawings wherein:

DETAILED DESCRIPTION

Figure 1:
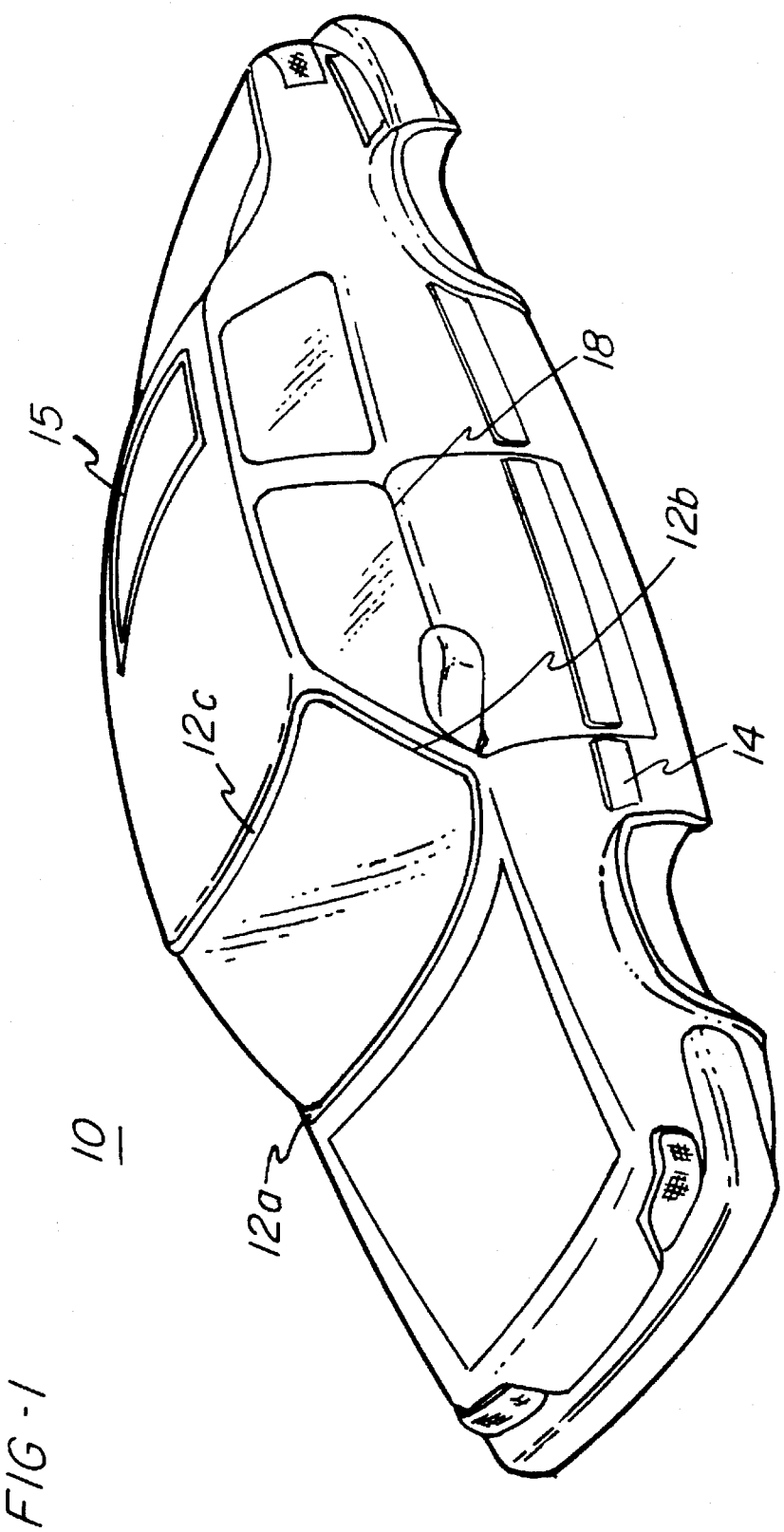
FIG. 1 is a perspective view of an automobile showing molding members that may be made in accordance with the invention.

Turning first to FIG. 1, there is shown, in perspective, automobile 10 of the type having a variety of elongated molding members. More specifically, these elongated molding members include the windshield molding members 12a, 12b, 12c, body side molding members 14, sun roof molding members 15 and inner and outer belt line molding members 18 (inner member not shown). Belt line molding members 18, provide interface between the door and body panels and the side windows of the automobile. These side windows are capable of reciprocal up and down, opening and closing movement as has been the custom for year. Although the present invention is particularly well adapted to produce belt line moldings 18, and will be described specifically in regard to such molding members, it is to be noted that the inventive methods and structure herein disclosed are equally applicable to any other flocked moldings.

Figure 2:
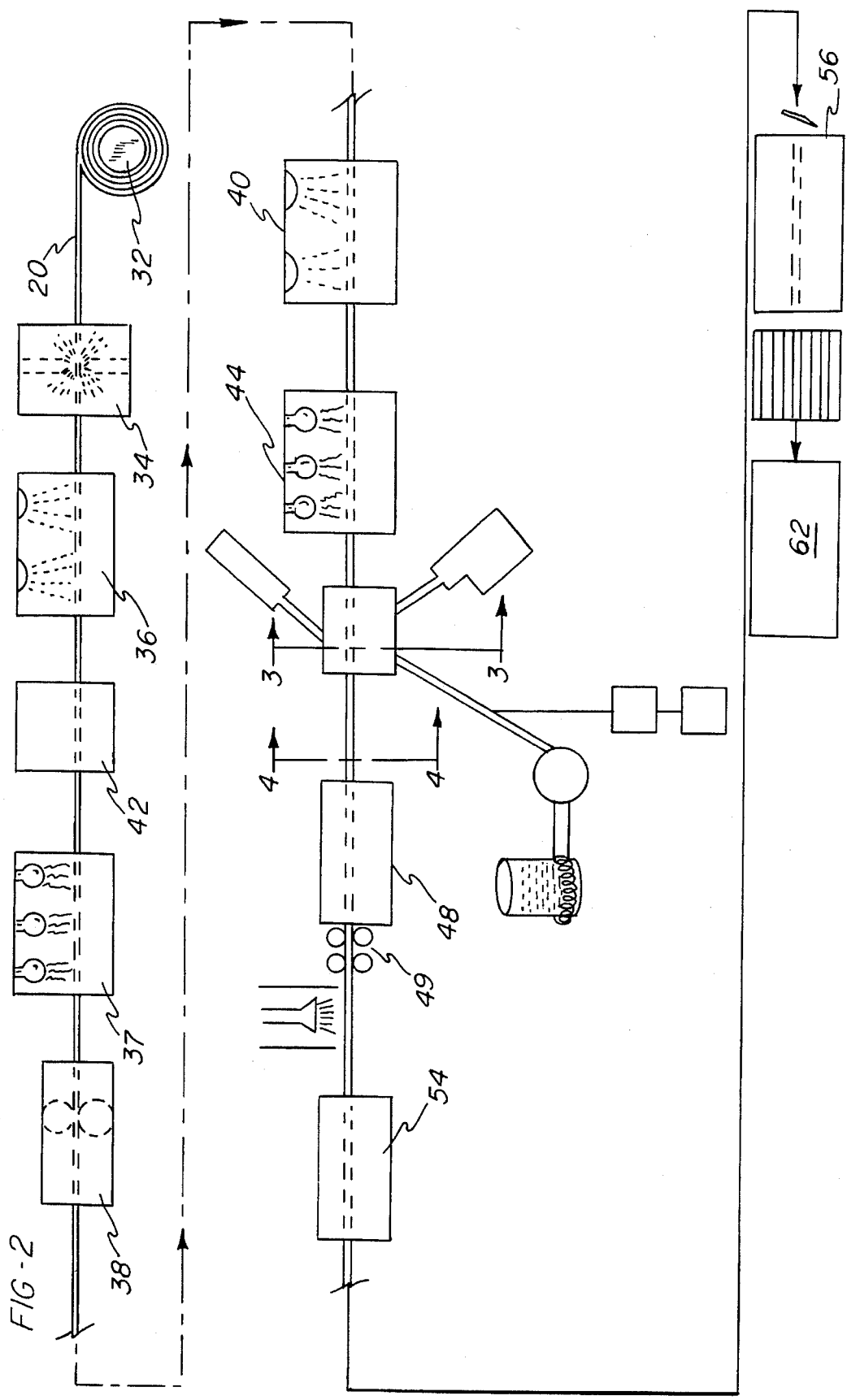
FIG. 2 is a diagrammatic process diagram showing a method for producing flocked, extruded moldings in accordance with the invention.

Turning now to FIG. 2, there is shown a schematic process diagram for forming a molding member such as the belt-line molding 18 shown in FIG. 1.

Metallic core material 20 is unwound from a spool or the like at unwinding station 32 and is then advanced to the welding station wherein ends of the core 20 from different spools are welded together. The core 20 advances to a washing station 36 wherein it is de-oiled and de-greased and is then forwarded to a first adhesive application station 42 wherein a first adhesive is applied to desired locations along the strip. Next, the strip is forwarded to heating station 37.

The type of adhesive to be applied at the station 42 should be chosen to effect a strong, durable adhesive bond between the core 20 and a first polymeric material referred to as a decorative polymer. The presently preferred first adhesive is an acrylic resin adhesive available from BF Goodrich under the Trademark A 1630 B. Although use of this adhesive is preferred, other adhesive types are also suitable.

The core is then forwarded to forming rolls 38 which, together, serve to profile the core 20 into the desired cross-sectional configuration depending upon automobile model and the specific molding member to be made—all as is well known in the art. Downstream from the forming station 38, the travelling and now profiled core is sent to washing station 40 followed by heater 44 the latter of which is used to effect cure of the adhesive supplied at station 42 and to heat the core material 20. The core exiting the downstream side of heating station 44 comprises a cured coat of a first adhesive in the desired locations thereon.

The core is then advanced to coextrusion die head 46, at an upstream location thereof a decorative polymer is supplied from decorative polymer extruder 100 to the die via conduit 102. The decorative polymer is chosen primarily by reason of its aesthetic properties including gloss and color and other properties. Preferably, the decorative polymer is capable of forming an adhesive bond itself with the elastomeric polymer. This eliminates need for use of separate adhesive for the decorative polymer and the elastomeric polymer.

Just downstream from conduit 102, elastomeric polymer is fed to die head 46 via conduit 106 communicating with elastomeric polymer extruder 104. Preferably, the decorative polymer and elastomeric polymer are chosen so that the elastomer can be directly placed over desired portions of the decorative polymer, with an adhesive bond formed between these two polymer types. This provides advantage in that separate adhesives, i.e., one adapted to bond decorative polymer to substrate and the other adapted to bond elastomer to substrate, need not be provided.

The elastomer is a thermoplastic elastomer (TPE). Generally, these TPEs comprise a well known family of materials that have elastomeric properties but can also be processed like thermoplastic materials. When the TPEs are made from polyolefinic materials, they are known in the industry as thermoplastic olefin elastomers (TPO). The TPOs are generally made by blending two or more polymers, or by synthesizing block copolymers or graft copolymers.

The TPEs can be further classified as being essentially polar macromolecules or non-polar macromolecules.

In this regard, non-polar TPEs, specifically non-polar TPOs, are generally described in U.S. Pat. Nos. 4,130,535 (Coran et al.); 4,311,628 (Abdou-Sabet et al.); and 4,409,365 (Coran et al.). All of these patents are incorporated herein to the extend needed to complete the instant disclosure. Non-polar TPOs of the type described in these three patents are commercially sold by Monsanto under the "Santoprene" trademark. Basically, these non-polar TPOs are copolymers and terpolymers comprising blends of olefinic elastomers, such as the EPDM and EPM rubbers, copolymerized with polyolefinic resins, such as polyethylene, polypropylene, poly 1-butene, poly 1-pentene, etc. Typically, the non-polar TPO is provided with a curative agent which, upon application of heat, promotes the curing of the elastomeric segment of the non-polar TPO.

Although non-polar TPEs may be utilized in accordance with the invention, it is presently preferred to use a polar TPE. Such polar TPEs are disclosed, for instance, in U.S. Pat. No. 4,957,968 (Adur et al.)—the disclosure of which is incorporated by reference herein to complete the disclosure. These polar TPEs comprise copolymer segments, similar to the non-polar TPEs (i.e., olefinic rubber and crystalline olefinic monomer segments) but additionally comprise one or more functional groups, such as those chosen from carboxylic acid, including its anhydrides and acid chlorides, isocyanates, oxazolines, epoxides, amines, and hydrochlorides. One polar TPE, presently preferred for use, is sold under the trademark "Alcryn" by DuPont. This particular polar TPE is described as a halogenated olefin. This particular product is melt processible and can be injection molded, extruded, extrusion blow molded, calendared or thermo-formed by a plurality of fabricating techniques.

The decorative polymer is chosen by reason of its aesthetic properties and also preferably by its ability to provide effective bonding with the elastomer. In this regard, and in the case when a polar TPE is chosen as the elastomeric material, polar polymers, such as polyvinylchloride, polyvinylidene chloride, polyvinyl acetal, polyvinyl formal, and polyvinyl butyral may be selected. At present, it is preferred to use polyvinyl chloride as the decorative polymer with the polar TPE, specifically "Alcryn" halogenated olefin. Conversely, when a non-polar TPE is to be utilized as the elastomeric material, non-polar decorative polymers may be utilized to form the molding. Preferred for use are the non-polar polyolefinic materials, such as polyethylene and polypropylene. Although not presently preferred for use, a combination of polypropylene as the decorative polymer may be utilized in conjunction with "Santoprene", non-polar TPE acting as the elastomer.

Immediately downstream from conduit 106 and associated feed of TPE onto the travelling core, a hot melt-type adhesive is applied to the requisite surfaces of the core 20. As shown, the hot melt adhesive is coextruded in die head 46, directly over desired portions of the elastomeric layer. Use of the hot melt adhesive provides significant advantage. First, these adhesives comprise little or zero toxic organic solvents such as toluene, xylene, etc. in the product. Accordingly, low or zero V-O-C emissions are attributed thereto. Secondly, use of a hot melt adhesive for forming an adhesive layer for the flock eliminates need for an oven downstream from the flocking station. Additionally, application of the hot melt along the desired surface in the die head 46 provides greater control over application thickness than in conventional processes in which the hot melt is fed to the gap between the traveling core and a specially configured adhesive applicator roll.

With regard to the types of reactive hot melt adhesives that may be used, these can be varied over a wide range, with particular hot melts chosen by their ability to provide effective adhesive bonding between the flocking fibers and desired substrate. The term "reactive" means that the adhesive can be heated and then "reactivated" by subsequent heating usually within 4 hours after the original heating.

Presently preferred reactive hot melt adhesives include the aliphatic and/or aromatic isocyanate based reaction products that are normally of the urethane prepolymer type. These cure via moisture. These types of hot melts are detailed, for example, in U.S. Pat. Nos. 4,319,942 (Brenner) and 4,891,269 (Markevka et al.). The disclosures of these patents are herein incorporated by reference. The hot melt adhesive presently preferred for use is available from Swift Adhesives, Downers Grove, Ill. under the product name 22303 hot melt. It is characterized as a urethane type adhesive based partly upon methylene bis(phenylisocyanate) (MBI). This adhesive cross links (i.e. cures) via exposure to moisture.

Other exemplary hot melt adhesives include those having olefinic repeat units such as ethylene-vinyl acetate resins, styrene-butadiene block copolymers, styrene-isobutylene resins, and atactic polypropylenes, etc.

Hot melt reservoir 108 is supplied with a suitable heating means 110 which is regulated to provide a suitable flowable viscosity for the hot melt. Pump 112 pumps the hot melt to die head 46 through conduit 120. Pump 112 is preferably a gear pump adapted to maintain a constant pressure on the pumped adhesive. One such pump is available from Nordson Corp. under the "Meltex" brand name. Pump 112 must be sealed to prevent premature cure of the hot melt. Thermocouple 114 measures the hot melt adhesive temperature in the conduit and sends this information to microprocessor control unit 116 which, in turn, regulates both the speed of the pump and the temperature of the adhesive. The viscosity of the hot melt, as pumped, can vary widely from about 5,000 cps. to 30,000 cps. and even greater. It is desirable to apply a thickness of hot melt in an amount of about 1–25 mils.

After the reactive hot melt has been placed on the travelling core, core 20 enters water bath 48, which cools and sets the thermoplastic decorative and thermoplastic elastomer applied in the die head 46 and the hot melt. The core is then pulled or stretched at pulling station 49 to provide the requisite tension on the traveling core.

Prior to entry into electrostatic flocking station 54, the core passes through heat lamp 50 which heats the hot melt to around its softening point to provide a tacky surface for subsequent reception of flock fibers at the station 54.

The flocking station 54 itself is conventional, with a multitude of short staple polyester or nylon fibers electrostatically attracted to the desired locations on the core.

The thus flocked molding member cools and cures at ambient as it travels to cutter 56 where it is cut transversely into desired lengths and then shipped via conveyor to inventory location 62.

Figure 3:
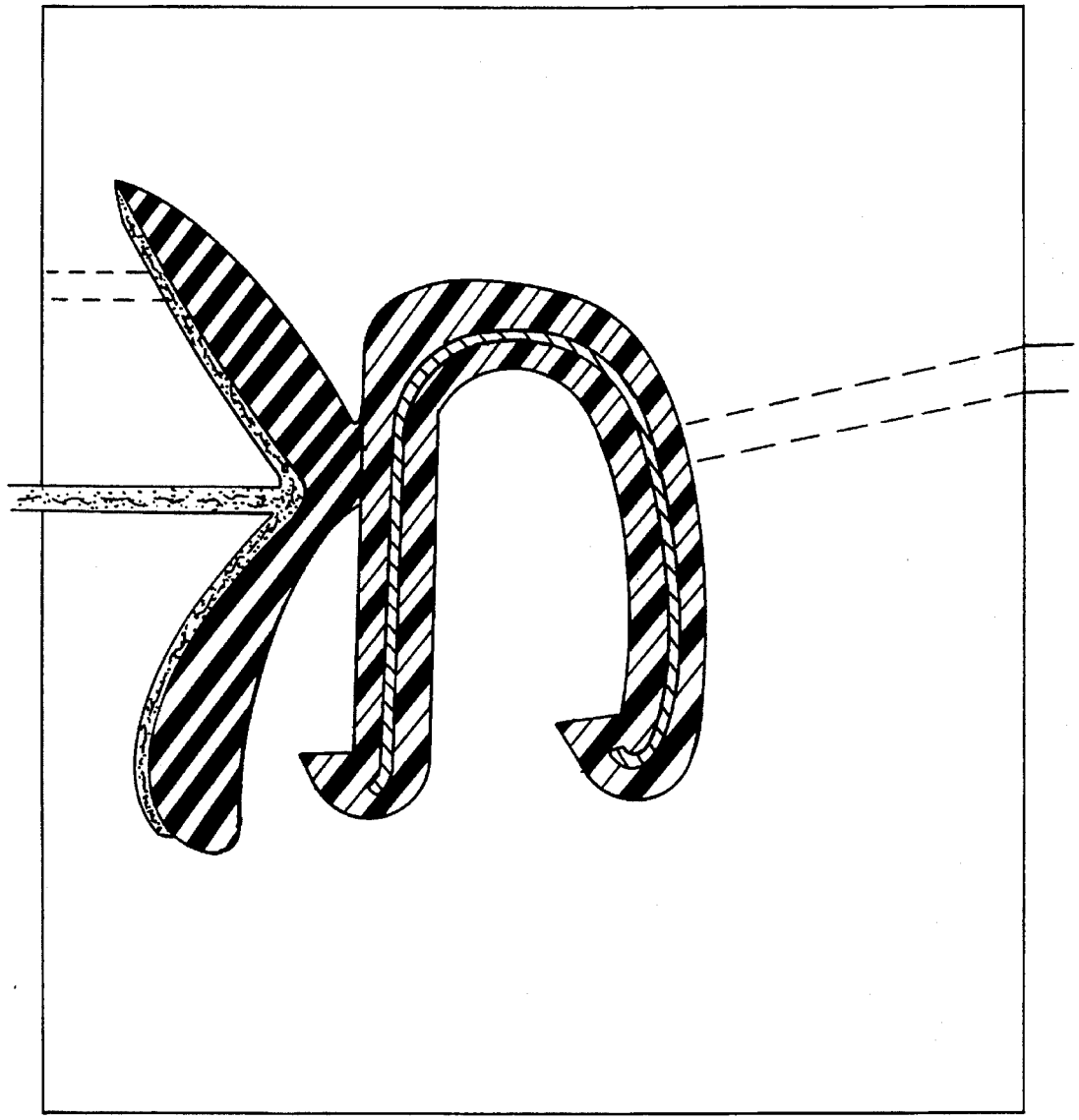
FIG. 3 is a cross-sectional view of a die used in the process, taken along the lines and arrows 3—3 of FIG. 2.

Turning now to FIG. 3, there is shown a transverse cross-section of die head 46 at the location at which hot melt adhesive is supplied to the core 20. As shown, the hot melt, decorative polymer, and thermoplastic elastomer are all applied to core 20 in the common die head 46. First decorative polymer 24 through conduit 102 is applied over first adhesive 22 to the core. The TPE 26 is injected to the die through conduit 106 with, as shown, the TPE directly overlying a portion of the decorative polymer (shown at interface 118).

A thin layer of hot melt adhesive 28 is fed to the die 46 and travelling core through conduit 120. It forms a thin layer over the desired portion of elastomer 26 and provides an adhesive site for subsequent location of fibrous flocking material.

Figure 4:
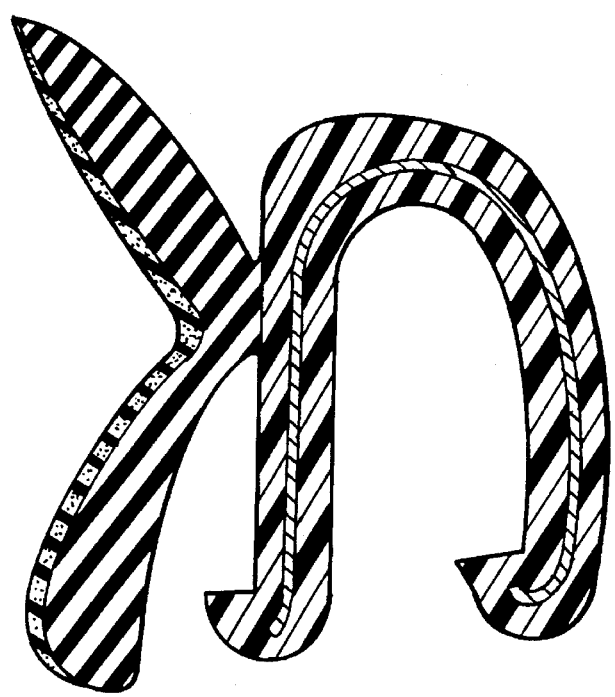
FIG. 4 is a cross-sectional view of the extrusion taken along the lines and arrows 4—4 of FIG. 2 showing the travelling extrusion at a point immediately downstream from the die.

FIG. 4 depicts the core as it departs from die 46 just upstream from immersion in water bath 48.

As shown decorative polymer 24 coats metallic core 20. Elastomeric polymer 26 is provided directly over a portion of decorative polymer 24 as shown at interface 118. The elastomeric polymer 26 is adapted to bear upon a window surface or surfaces. A thin layer of hot melt adhesive 28 is provided over those surfaces of hot elastomeric polymer 26 which will be flocked in accordance with conventional techniques.

Figure 5:
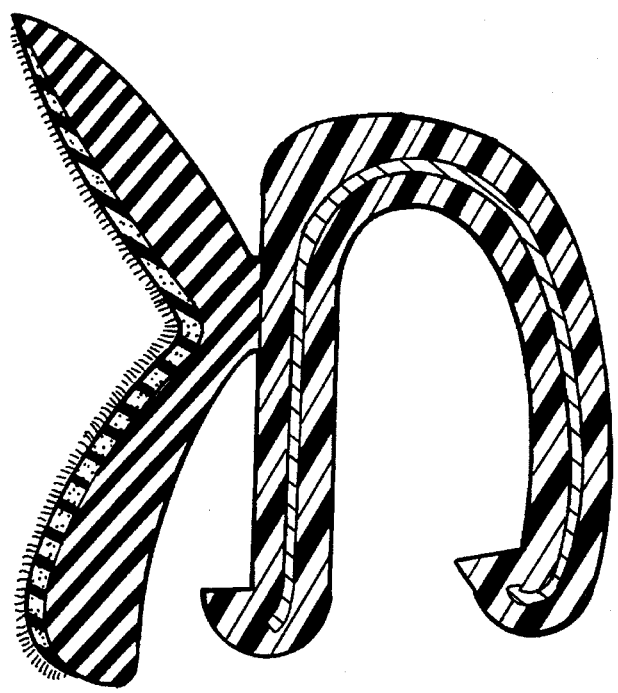
FIG. 5 is a cross-sectional view of a flocked, automobile molding member made in accordance with the instant process.

FIG. 5 shows a finished, flocked automobile molding member in accordance with the invention. Here, it can be seen that a multiplicity of flocked fibers 122 are adhesively bound to elastomeric polymer 26 along the adhesive layer provided by hot melt adhesive 28.

Figure 6:
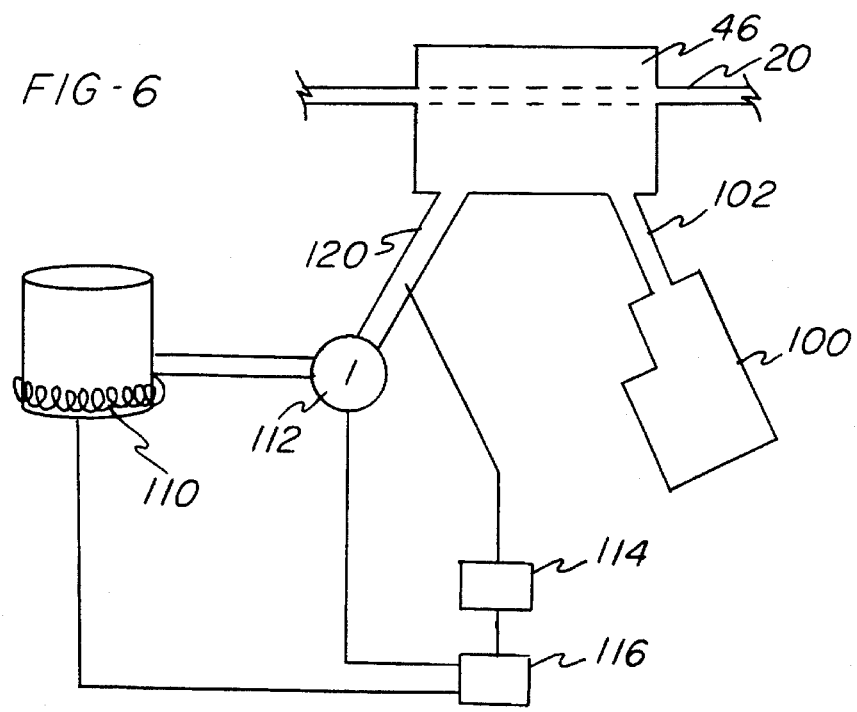
FIG. 6 is a schematic view of another embodiment of the die head 46 shown in FIG. 2 utilized when only one thermoplastic polymer is applied.

FIG. 6 shows a schematic illustration of another die head 46, associated polymer extruder and reactive hot melt feeding apparatus. Both upstream and downstream from die head 46 shown in this figure, the process is precisely as depicted in FIG. 2.

Here in this FIG. 6 embodiment a decorative polymer from extruder 100 is fed through conduit 102 to the die head 46. In this embodiment no elastomeric component is present. Preferably, the decorative polymer is PVC.

Reactive hot melt adhesive is fed to the die head 46 for application over the hot surface of the decorative polymer. Similar to the FIG. 2 embodiment, the hot melt is supplied to the die head through conduit 120 by pump 112. The hot melt is contained within sealed hot melt reservoir 108 which is provided with heating means 110. As per the embodiment shown in FIG. 2, a thermocouple and microprocessor are provided to control the pump and heater.

Figure 7:
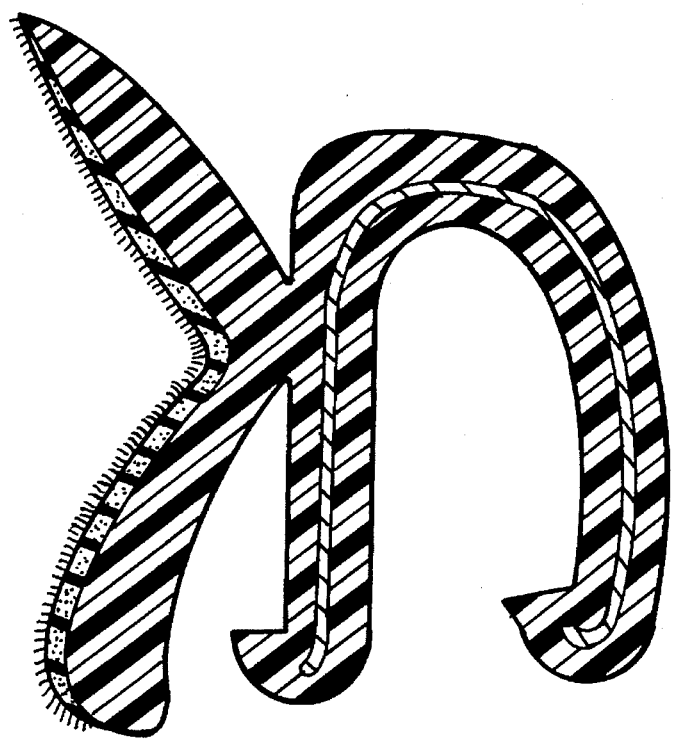
FIG. 7 is a cross-sectional view of a flocked automobile molding member made in accordance with the die head embodiment shown in FIG. 6.

FIG. 7 is a cross-sectional view of a finished, flocked automobile molding member made in accordance with the instant method using a die head of the type schematically shown in FIG. 6 Decorative polymer 24 coats metallic core 20. A thin layer of hot melt adhesive 28 is provided along one surface of the decorative polymer. Flocked fibers 122 are bound to the decorative polymer 24 by the adhesive 28.

Although this invention has been described with reference to a specific embodiment thereof, it will be appreciated that other modifications of the invention may be made, including the substitution of equivalent components or method steps in substitution for those described. Furthermore, the invention contemplates the use of certain method steps independently of others, all of which may be made without departing from the spirit and scope of the invention as defined in the appended claims.

What is claimed is:

1. In a method for making a flocked automotive molding member, the steps comprising
   a) forming a profiled strip of substrate material,
   b) forwarding said profiled strip to an extrusion die,
   c) applying a heated thermoplastic polymer over at least a portion of said strip in said die, heating a hot melt adhesive and applying a layer of said heated hot melt adhesive over at least a portion of said heated applied thermoplastic polymer in said die then, cooling said strip to set said thermoplastic polymer and said hot melt adhesive,
   d) subsequently re-heating said hot melt adhesive to provide a tacky surface,
   e) flocking said strip by applying a multitude of fibers to said tacky surface,
   f) moisture curing said hot melt adhesive; said step of applying said layer of hot melt adhesive comprising supplying said hot melt adhesive at a viscosity of about 5,000 to 30,000 cps onto said thermoplastic polymer, measuring the temperature of said hot melt adhesive as it is supplied to said die, and regulating the degree of said heating in response to said step of measuring said temperature.

2. Method as recited in claim 1 wherein said step of applying a layer of hot melt adhesive comprises forming a layer of between about 1 to 25 mils in thickness.

3. Method as recited in claim 1 further comprising regulating the flow rate of said hot melt adhesive supplied to said die.

4. Method as recited in claim 1 wherein said hot melt adhesive comprises a reactive isocyanate-based urethane adhesive and wherein said thermoplastic polymer comprises a thermoplastic elastomer.

5. Method as recited in claim 1 wherein said step of measuring the temperature of said hot melt adhesive comprises sending temperature information to a microprocessor and wherein said step of regulating said heating comprises controlling said heating by said microprocessor.

6. Method as recited in claim 1 wherein said hot melt adhesive is devoid of organic solvent.

* * * * *